United States Patent
Wada et al.

(10) Patent No.: US 7,180,063 B2
(45) Date of Patent: Feb. 20, 2007

(54) THERMAL INFRARED DETECTOR HAVING A SMALL THERMAL TIME CONSTANT AND METHOD OF PRODUCING THE SAME

(75) Inventors: Hideo Wada, Tokyo (JP); Naoki Oda, Tokyo (JP)

(73) Assignees: Director General, Technical Research Institute, Japan Defense Agency, Tokyo (JP); NEC Corporation, Tokyo (JP)

( * ) Notice: Subject to any disclaimer, the term of this patent is extended or adjusted under 35 U.S.C. 154(b) by 304 days.

(21) Appl. No.: 10/697,155

(22) Filed: Oct. 31, 2003

(65) Prior Publication Data

US 2004/0089807 A1   May 13, 2004

(30) Foreign Application Priority Data

Nov. 1, 2002   (JP) .............................. 2002/319384

(51) Int. Cl.
   *G01J 5/20*   (2006.01)
(52) U.S. Cl. ............... 250/338.1; 250/338.3; 250/338.4; 250/339.02; 250/330; 250/332
(58) Field of Classification Search ............ 250/338.1
   See application file for complete search history.

(56) References Cited

U.S. PATENT DOCUMENTS

| | | | |
|---|---|---|---|
| 6,046,485 A | 4/2000 | Cole et al. | |
| 6,333,270 B1 | 12/2001 | Sasaki | |
| 6,448,557 B2 | 9/2002 | Oda | |
| 6,528,789 B1 | 3/2003 | Oda | |
| 6,690,014 B1 * | 2/2004 | Gooch et al. | ............ 250/338.4 |

FOREIGN PATENT DOCUMENTS

| | | |
|---|---|---|
| JP | H08-285680 A | 11/1996 |
| JP | H10-122950 A | 5/1998 |
| JP | 11-330051 A | 11/1999 |
| JP | 2001-041818 A | 2/2001 |
| JP | 2001-153720 A | 6/2001 |
| JP | 2001-156277 A | 6/2001 |
| JP | 2001-215151 A | 8/2001 |

* cited by examiner

*Primary Examiner*—David Porta
*Assistant Examiner*—Djura Malevic
(74) *Attorney, Agent, or Firm*—Sughrue Mion, PLLC

(57) ABSTRACT

In an area of a diaphragm 5 as an infrared photosensitive portion of a thermal infrared detector, a fourth dielectric protective film 8c is etched and reduced in thickness to form a fifth dielectric protective film 8d so that the thickness of the diaphragm 5 as a whole is reduced. With this structure, the thermal capacity of the diaphragm 5 is decreased and the thermal time constant is reduced. This enables the thermal infrared detector to be operated at a high frame rate. A bolometer thin film 7 is formed throughout an entire surface of the diaphragm 5.

9 Claims, 9 Drawing Sheets

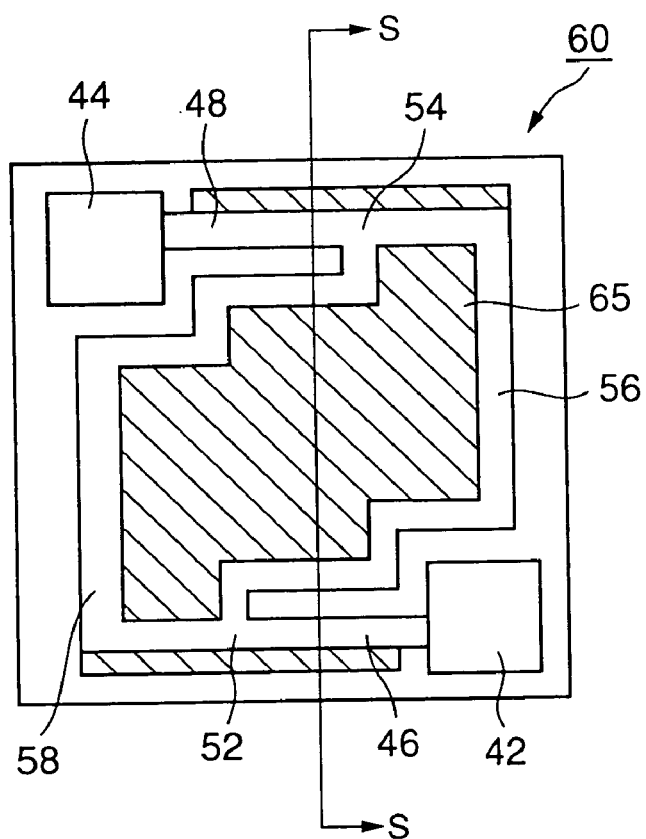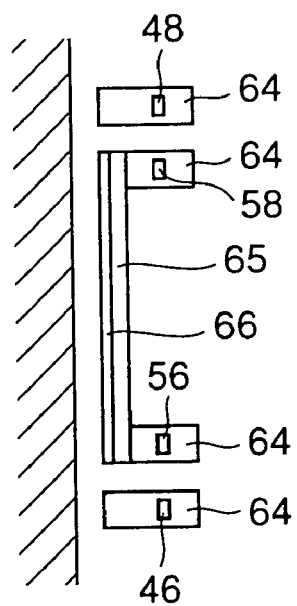
FIG. 3A  PRIOR ART
FIG. 3B  PRIOR ART

THERMAL INFRARED DETECTOR HAVING A SMALL THERMAL TIME CONSTANT AND METHOD OF PRODUCING THE SAME

This invention claims priority to prior Japanese patent application JP 2002-319384, the disclosure of which is incorporated herein by reference.

BACKGROUND OF THE INVENTION

This invention relates to a thermal infrared detector having a thermal isolation structure and, in particular, to a thermal infrared detector capable of avoiding occurrence of image blur even if operation is carried out at a high frame rate and of suppressing increase in 1/f noise and to a method of producing the same.

For example, a conventional thermal infrared detector of the type is disclosed in Japanese Unexamined Patent Publication JP 2001-215151 A. The thermal infrared detector has a shield above a photosensitive portion.

Referring to FIG. 1, the conventional thermal infrared detector will be described.

The thermal infrared detector comprises a substrate 1, a plurality of diaphragms $5p$ each of which forms a diaphragm structure spatially separated from the substrate 1 and serves as an infrared photosensitive portion, a plurality of beams $6p$ supporting the diaphragms $5p$, and a plurality of shields $12p$ each of which extends outward from an outer perimeter of the diaphragm $5p$. The thermal infrared detector comprises a substrate 1 and a plurality of infrared photosensitive portions each of which forms a diaphragm structure spatially separated from the substrate 1. Each infrared photosensitive portion comprises a diaphragm $5p$, a plurality of beams $6p$ supporting the diaphragm $5p$, and a plurality of shields $12p$ which extends outward from an outer perimeter of the diaphragm $5p$. On the substrate 1, an infrared reflecting film 2 and a first dielectric protective film 3 are formed. Each of the diaphragms $5p$ comprises a thermistor-bolometer thin film (hereinafter briefly be called a bolometer thin film) $7p$, a pair of electrode portions $10p$, and a second dielectric protective film $14a$ surrounding the bolometer thin film $7p$ and the electrode portions $10p$. The shield $12p$ extending outward from the outer perimeter of the diaphragm $5p$ covers the beam $6p$ with an interposed space. The beam $6p$ comprises a metal wiring $9p$ and a third dielectric protective film $14b$ surrounding the metal wiring $9p$.

Infrared radiation or light incident to the diaphragm $5p$ on its upper surface is partly received and absorbed by a material of the diaphragm $5p$ and partly passes through the diaphragm $5p$. The infrared light which has passed through the diaphragm $5p$ is reflected by the infrared reflecting film 2 on the substrate 1 and is again incident to the diaphragm $5p$ to be absorbed. The infrared light absorbed as mentioned above heats the diaphragm $5p$ as the photosensitive portion to change the resistance of the bolometer thin film $7p$. By applying a bias electric current to the bolometer thin film $7p$, the amount of infrared light received by the diaphragm $5p$ is converted into voltage change which is read as a signal.

The technique disclosed in JP 2001-215151 A is applicable, for example, to a thermal infrared array sensor in which the number of pixels is 320×240 and the pixel pitch is 40 μm. In the thermal infrared array sensor, the bolometer thin film $7p$ comprises a vanadium oxide film having a thickness of 100 nm and a temperature coefficient of resistance of −2%/K. The dielectric protective film $14a$ of the diaphragm $5p$ comprises a silicon nitride film having a thickness of 500 nm. The electrode portion $10p$ on the diaphragm $5p$ comprises a titanium film having a thickness of 100 nm. The dielectric protective film $14b$ of the beam $6p$ comprises a silicon nitride film having a thickness of 500 nm, a width of 2.6 μm, and a length of 86 μm. The metal wiring $9p$ of the beam $6p$ comprises a titanium film having a thickness of 100 nm, a width of 1 μm, and a length of 86 μm. A dielectric protective film of the shield $12p$ comprises a silicon nitride film having a thickness of 500 nm. The shield $12p$ has an aperture ratio of 90%. The number of bends of the beam is two or slightly more. In the thermal infrared array sensor of a thermal isolation structure having the above-mentioned specification, the thermal capacity is $1.4 \times 10^{-9}$ J/K, the thermal conductance is $8.2 \times 10^{-2}$ W/K, and the thermal time constant is 15 ms. For a F/1 optical system, an infrared image having a temperature resolution of about 30 mK could be obtained.

Japanese Unexamined Patent Publication JP 2001-153720 A discloses another thermal infrared detector having a thermal isolation structure. In this publication, the number of bends of the beam which gives a best temperature resolution is represented by a beam length index which is a function of a pixel size of the infrared detector.

Referring to FIG. 2, the thermal infrared detector will be described. A pixel 31 comprises a diaphragm 32 as a photosensitive portion, a pair of beams $33a$ and $33b$ supporting the diaphragm 32, and a pair of cell contact electrodes $35a$ and $35b$. The beams $33a$ and $33b$ are provided with wirings $36a$ and $36b$, respectively. The diaphragm 32 comprises a bolometer thin film, electrode portions, and a dielectric protective film surrounding the thin film and the electrode portions. The diaphragm 32 is spatially separated from the beams $33a$ and $33b$ by slits $34a$ and $34b$, respectively. The diaphragm 32 is spatially separated from a lower substrate (not shown) to be afloat in the air, like in FIG. 1.

The technique disclosed in JP 2001-153720 A is applicable, for example, to a thermal infrared array sensor in which the number of pixels is 320×240 and the pixel pitch is 25 μm. In the array sensor, the bolometer thin film comprises a vanadium oxide film having a thickness of 100 nm and a temperature coefficient of resistance of −2%/K. The dielectric protective film of the diaphragm 32 comprises a silicon nitride film having a thickness of 500 nm. The electrode portion of the diaphragm 32 comprises a titanium alloy film having a thickness of 100 nm. A dielectric protective film of each of the beams $33a$ and $33b$ comprises a silicon nitride film having a thickness of 500 nm, a width of 2 μm, and a length of 32 μm. Each of the metal wirings $36a$ and $36b$ of the beams $33a$ and $33b$ comprises a titanium alloy film having a thickness of 100 nm, a width of 1 μm, and a length of 32 μm. The diaphragm 32 as an infrared photosensitive portion has an aperture ratio of 51%. Each of the slits $34a$ and $34b$ has a width of 0.5 μm. In this case, an optimum value of the number of bends of the beam is 1.3. In the thermal infrared array sensor of a thermal isolation structure having the above-mentioned specification, the thermal capacity is $3.3 \times 10^{-10}$ J/K, the thermal conductance is $8.5 \times 10^{-2}$ W/K, and the thermal time constant is 3.9 ms. For a F/1 optical system, an infrared image having a temperature resolution of 100 mK could be obtained.

By combining the technique disclosed in JP 2001-215151 A and JP 2001-153720 A, it is possible to propose a high-sensitivity thermal infrared detector which has the number of bends of a beam or the beam length index giving a best temperature resolution, which has a shield extending outward from an outer perimeter of the diaphragm, and which has a thermal isolation structure.

As a specific example, description will be made of the case where the thermal infrared detector described in conjunction with JP 2001-153720 A is provided with a shield of an aperture ratio of 92%. As a dielectric protective film of the shield, a silicon nitride film having a thickness of 500 nm was used. As a result, the thermal capacity of $5.2\times10^{-10}$ J/K, the thermal conductance of $8.8\times10^{-2}$ W/K, and the thermal time constant of 6 ms were obtained. For a F/1 optical system, an infrared image having a temperature resolution of 60 mK could be obtained.

Furthermore, an uncooled infrared sensor is disclosed in U.S. Pat. No. 6,046,485. Referring to FIG. 3A, the uncooled infrared sensor having a thermal isolation structure has a pixel 60. The pixel 60 comprises a photosensitive portion including an infrared absorbing portion 65 and a pair of outer bolometer portions 56 and 58, a contact portion including a pair of cell contact electrodes 42 and 44, and a pair of beams 46 and 48 electrically and mechanically connecting the photosensitive portion and the contact portion. The photosensitive portion and the beams 46 and 48 are connected via junctions 52 and 54. As seen from FIG. 3B, the photosensitive portion (56, 58, 65) is supported by the beams 46 and 48 to be afloat above the substrate. Thus, the thermal isolation structure is formed.

In the above-mentioned United States patent, the photosensitive portion has a structure in which the infrared absorbing portion 65 alone is reduced in thickness without reducing the thickness of a protective film 64 surrounding the outer bolometer portions 56 and 58. With the above-mentioned structure, the thermal capacity of the photosensitive portion (56, 58, 65) is decreased and the thermal time constant is reduced. Thus, the uncooled infrared sensor having a thermal isolation structure and operable at a high frame rate is achieved.

However, the conventional thermal infrared detectors mentioned above are disadvantageous in the following respects.

At first, consideration will be made of the case where the techniques of JP 2001-215151 A and JP 2001-153720A are combined. In this case, if the temperature resolution is improved, the thermal time constant is increased. When the infrared detector is operated at a high frame rate of 120 Hz, image blur occurs. This is because, in the above-mentioned thermal infrared detector, the beam and the diaphragm are equal in thickness to each other.

The structure described in U.S. Pat. No. 6,046,485 is disadvantageous in that 1/f noise from the bolometer portion is large. This is presumably because a bolometer material is present only at an outer perimeter of the photosensitive portion so that the total number of carriers is small and, therefore, the 1/f noise is large. The above presumption is based on the theory that the 1/f noise of the bolometer is smaller as the total number of carriers in the bolometer material is greater (see P. H. Handel, Phys, Rev. A, Vol. 22, 1980, p. 745).

SUMMARY OF THE INVENTION

It is an object of this invention to provide a thermal infrared detector having a thermal isolation structure, which is capable of preventing occurrence of image blur even if operation is carried out at a high frame rate and which is capable of preventing increase in 1/f noise, as well as a method of producing the same.

In a thermal infrared detector according to this invention, a protective film of a diaphragm is etched so that the total thickness of the diaphragm is reduced. In this manner, the thermal capacity of the diaphragm is decreased and the thermal time constant is reduced so that operation at a high frame rate can be carried out. As a consequence, it is possible to prevent occurrence of image blur. Furthermore, a bolometer thin film as a heat detecting material thin film is formed throughout an entire surface of the diaphragm. Therefore, increase in 1/f noise is prevented.

Specifically, the thermal infrared detector according to this invention has a thermal isolation structure comprising a diaphragm (5) as an infrared detecting portion, a beam (6) supporting the diaphragm, and a shield (12) extending outward from an outer perimeter of the diaphragm and covering the beam and a contact pad (16) of a substrate (1) with an interposed space.

The diaphragm comprises a bolometer thin film (7) as a heat detecting material thin film, an electrode portion (10) for reading a signal from the bolometer thin film, and protective films (8a, 8b, 8d) surrounding the bolometer thin film and the electrode portion. The beam comprises a metal wiring (9) and the protective films (8a, 8b, 8c) surrounding the metal wiring. The metal wiring is electrically connected to an electric circuit of the substrate through the contact pad. Desirably, the substrate is provided with a signal readout circuit.

In case where the material of each of the shield and the diaphragm is transparent to the infrared light, an infrared absorbing film (11) is formed on an infrared incident surface of each of the shield and the diaphragm in order to absorb the infrared light by the interference effect. In case where each of the shield and the diaphragm is made of a material absorbing the infrared light, it is unnecessary to form the infrared absorbing film. Thus, it is desired to absorb the infrared light over a wide range, for example, throughout entire surfaces of the diaphragm and the shield.

One of the important factors of this invention is that the thickness of the diaphragm is smaller than that of the beam. With this structure, the thermal time constant of the thermal infrared detector of this invention is reduced so that operation at a high frame rate can be carried out. By adopting the above-mentioned structure, it is possible to achieve a sensor having a high fill factor, a higher sensitivity, and a higher frame rate.

Herein, description will be made about the characteristic of this invention that the operation at a high frame rate is possible by the structure in which "the thickness of the diaphragm is smaller than that of the beam".

The thermal time constant $\tau_{th}$ of the thermal infrared detector having a thermal isolation structure is represented by Equation (1):

$$\tau_{th} = C_{th}/G_{th} \quad (1)$$

$$C_{th} = c_{vP}A_{P}t_{P} + c_{vBL}A_{BL}t_{BL} + 2c_{vM}A_{M}t_{M} + c_{vH}A_{H}t_{H} + c_{vA}A_{A}t_{A}$$

$$G_{th} = 2\left(k_{M}\frac{W_{BM}t_{BM}}{l_{M}} + k_{P}\frac{W_{BP}t_{BP}}{l_{P}}\right) + 8\pi\sigma T^{3}(A_{H} + A_{P})$$

Herein, $C_{th}$ and $G_{th}$ represent the thermal capacity of the diaphragm and the thermal conductance of the thermal isolation structure, respectively.

In Equation (1), it is assumed that $G_{th}$ is determined by thermal conduction of the beam and heat radiation of the diaphragm. $c_{vP}$, $A_{P}$, and $t_{P}$ represent the specific heat at constant volume, the area, and the thickness of the protective film of the diaphragm, respectively. $C_{vBL}$, $A_{BL}$, and $t_{BL}$ represent the specific heat at constant volume, the area, and the thickness of the heat detecting material 7, respectively. $C_{vM}$, $A_M$, and $t_M$ represent the specific heat at constant volume, the area, and the thickness of the electrode portion, respectively. $C_{vH}$, $A_H$, and $t_H$ represent the specific heat at constant volume, the area, and the thickness of the material of the shield, respectively. $C_{vA}$, $A_A$, and $t_A$ represent the specific heat at constant volume, the area, and the thickness of the infrared absorbing film, respectively. $k_M$, $W_{BM}$, $t_{BM}$, and $I_M$ represent the thermal conductivity, the width, the thickness, and the length of the metal wiring material forming the beam, respectively. $k_P$, $W_{BP}$, $t_{BP}$, and $I_P$ represent the thermal conductance, the width, the thickness, and the length of the protective film forming the beam, respectively. In most cases, the relationship $I_M = I_P$ holds. T represents an absolute temperature of the diaphragm and σ represents the Stefan-Boltzman constant.

In the conventional examples, the thickness $t_P$ of the protective film of the diaphragm is equal to the thickness $t_{BP}$ of the protective film of the beam. On the other hand, in this invention, the protective film of the diaphragm is etched and reduced in thickness so that the relationship $t_P < t_{BP}$ holds. Therefore, $C_{th}$ in this invention is smaller than $C_{th}$ in the conventional examples. Thus, the thermal time constant of this invention is smaller than that in the conventional examples so that imaging can be carried out at a high frame rate.

BRIEF DESCRIPTION OF THE DRAWING

FIG. 3A is a plan view of still another conventional thermal infrared detector reduced in thermal capacity;

FIG. 3B is a sectional view taken along a line 3B—3B in FIG. 3A;

DESCRIPTION OF THE PREFERRED EMBODIMENT

Figure 1:
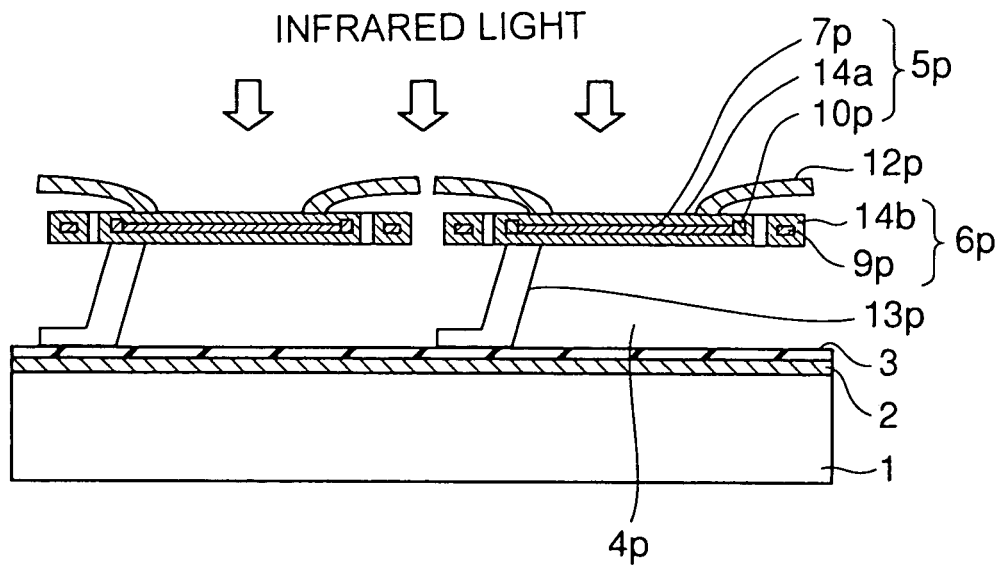
FIG. 1 is a sectional view showing a conventional thermal infrared detector with a shield.
Figure 2:
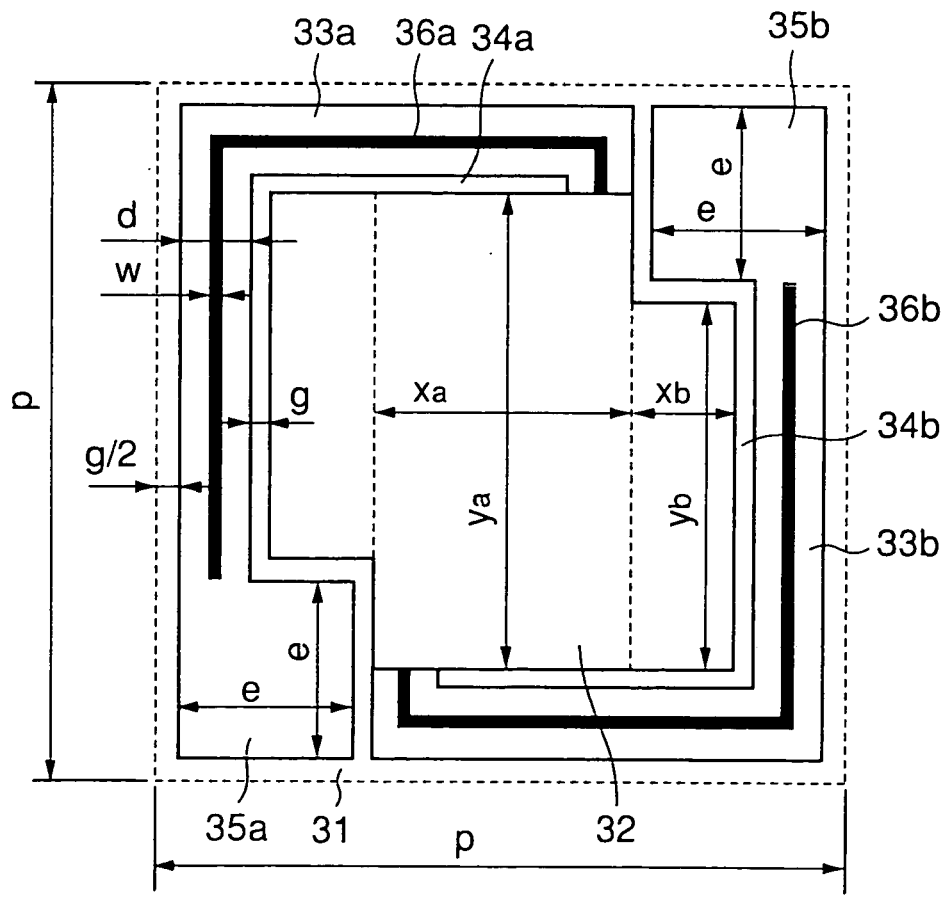
FIG. 2 is a plan view showing another conventional thermal infrared detector.

Now, description will be made of embodiments of this invention with reference to the drawing.

Figure 4:
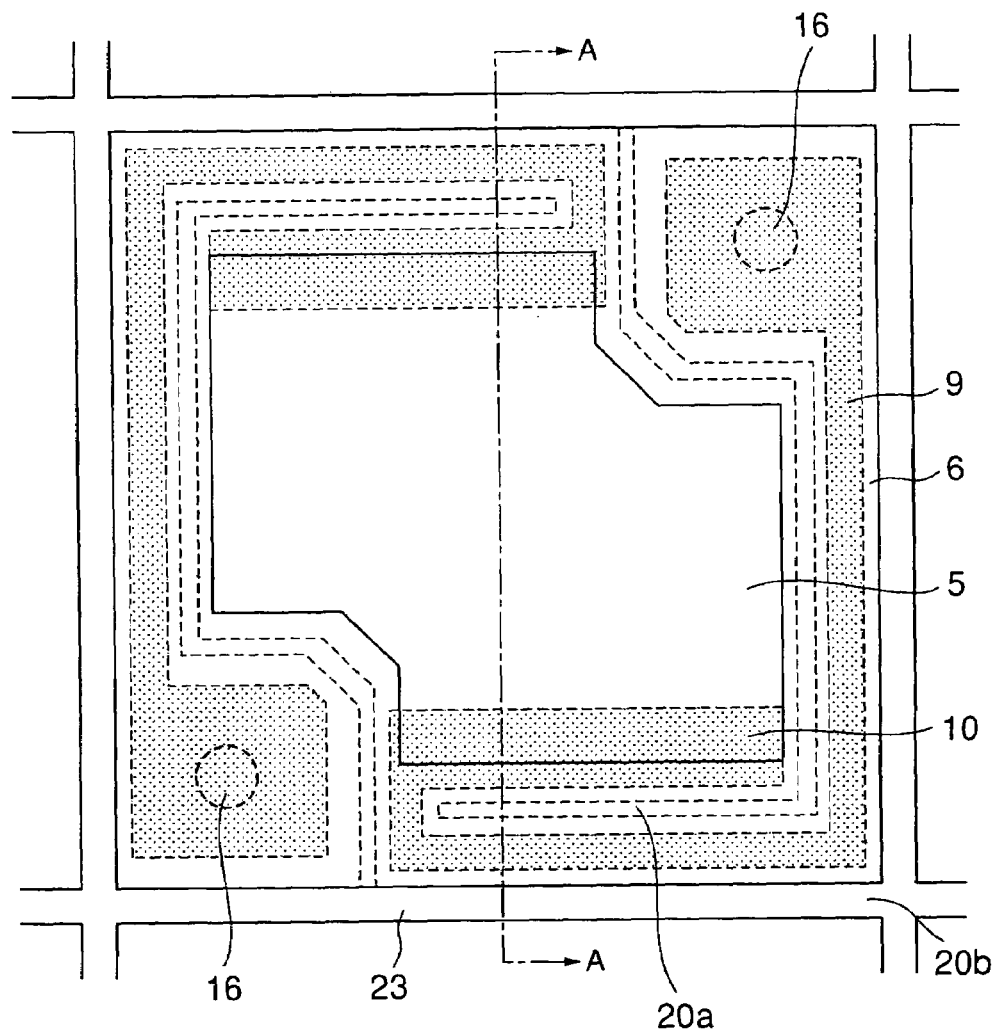
FIG. 4 is a plan view of a thermal infrared detector according to one embodiment of this invention.
Figure 5:
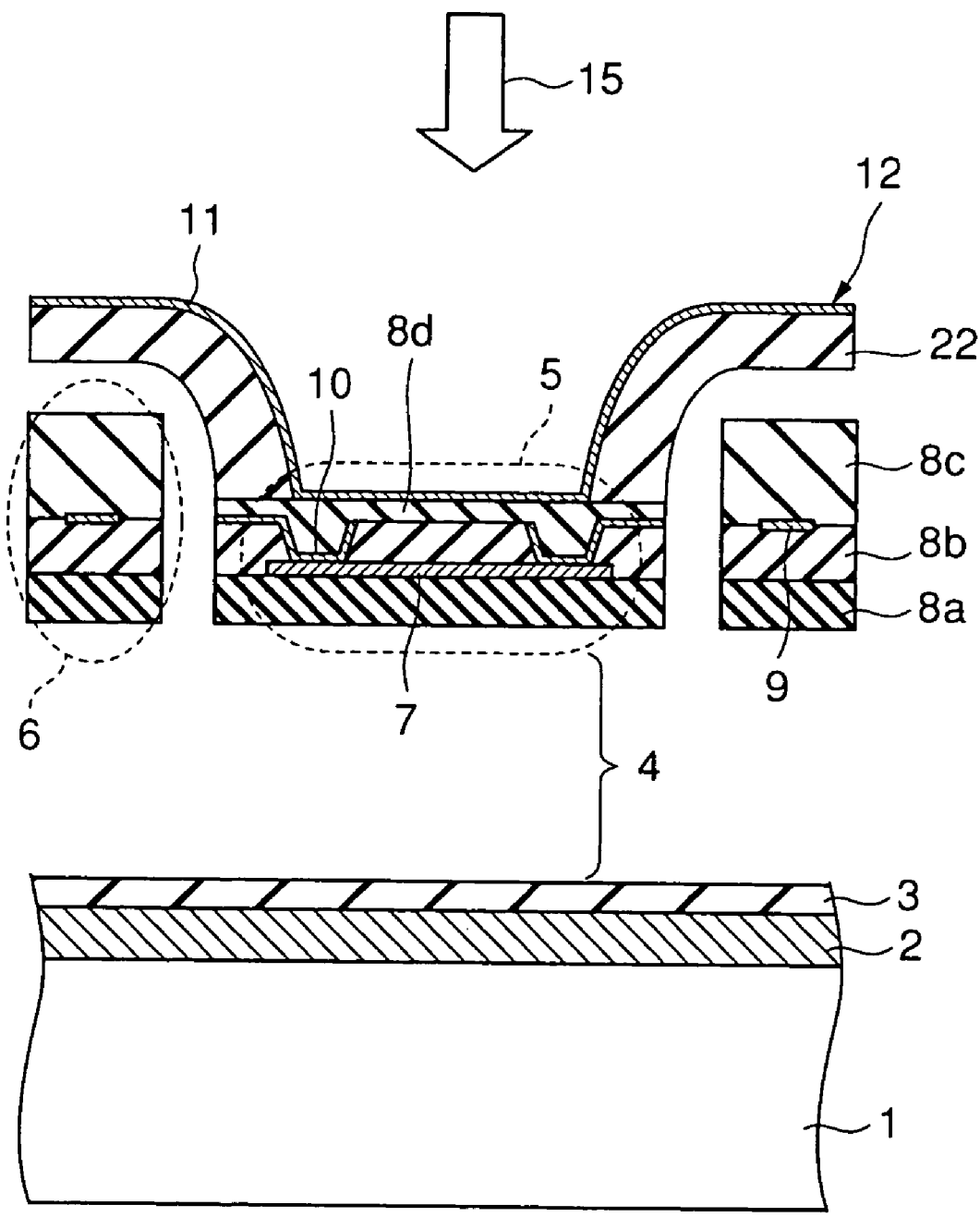
FIG. 5 is a sectional view taken along a line 5—5 in FIG. 4.

Referring to FIGS. 4 and 5, a thermal infrared detector having a thermal isolation structure according to one embodiment of this invention is of a thermistor-bolometer type and has a structure as a two-dimensional array sensor having a pixel pitch of 23.5 μm. In FIG. 4, a single pixel is shown in plan view.

At first, as illustrated in FIG. 5, the thermal infrared detector comprises a silicon substrate (hereinafter simply called a substrate) 1. On the silicon substrate 1, an infrared reflecting film 2 made of titanium (Ti) and having a thickness of 200 nm is formed. On the surface of the infrared reflecting film 2, a first dielectric protective film 3 comprising a silicon oxide film and having a thickness of 200 nm is formed. The first dielectric protective film 3 covers the infrared reflecting film 2. In this embodiment, titanium is used as a metal material forming the infrared reflecting film 2. Instead of titanium, use may be made of any appropriate material which reflects substantially 100% of infrared light in the wavelength band of 8–13 μm, for example, aluminum (Al), tungsten (W), tungsten silicide (WSi), titanium nitride (TiN), or the like. The first dielectric protective film 3 comprises a silicon oxide film in this embodiment but may be a silicon nitride film or a silicon oxynitride film.

In the thermal infrared detector of this embodiment, a plurality of diaphragms 5 as an infrared detecting portion are disposed above one surface of the substrate 1 on the side of the first dielectric protective film 3. Each diaphragm 5 defines each pixel. The diaphragm 5 is supported by two beams 6 to be afloat above the surface of the first dielectric protective film 3 and separated by a cavity 4 therefrom. As illustrated in FIG. 4, the beams 6 extend along an outer perimeter of the diaphragm 5 as seen from an upper surface of the diaphragm 5 in order to reduce thermal conductance between the diaphragm 5 and the substrate 1.

The diaphragm 5 comprises a thermistor-bolometer thin film (hereinafter simply called a bolometer thin film) 7 as a heat detecting material thin film, a pair of electrode portions 10 formed at opposite end portions of the bolometer thin film 7, and second, third, and fifth dielectric protective films 8a, 8b, and 8d surrounding the bolometer thin film 7 and the electrode portions 10. In this embodiment, the bolometer thin film 7 comprises a vanadium oxide film having a thickness of about 120 nm. The bolometer thin film 7 has a resistance of about 100 kΩ and a temperature coefficient of resistance of about −3%/K. The second, the third, and the fifth protective films 8a, 8b, and 8d comprise silicon nitride films having a thickness of 150 nm, 100 nm, and 50 nm, respectively.

Each of shields 12 extends outward from the outer perimeter of the diaphragm 5 and covers the beam 6 and a contact pad 16 of the substrate 1 with a space interposed between the beam 6 and the shield 12. An infrared absorbing film 11 is formed at an uppermost layer of the shield 12 and on an exposed surface of the dielectric protective film 8d of the diaphragm 5. In this embodiment, the shield 12 comprises a silicon nitride film having a thickness of 500 nm. The infrared absorbing film 11 comprises a titanium nitride film having a sheet resistance of 200–560 Ω.

Each of the beams 6 comprises a metal wiring 9 and the dielectric protective films 8a, 8b, and 8c surrounding the metal wiring 9. In this embodiment, the metal wiring 9 comprises a titanium film having a width of 0.6 μm and a thickness of 150 nm. Each of the dielectric protective films 8a, 8b, and 8c comprises a silicon nitride film having a thickness of 150 nm, 100 nm, and 250 nm, respectively, and a width of 1 μm.

A gap between the shields of adjacent pixels is equal to 1 μm. Each of the contact pads 16 has an area of about 49 μm².

In the thermal isolation structure with the shield in this embodiment, the thermal conductance of 0.15 μW/K, the thermal capacity of 0.39 nJ/K, and the thermal time constant of 2.6 ms were obtained. When the thermal infrared array sensor of a bolometer type having 160×120 pixels was operated at a frame rate of 120 Hz, the temperature resolution of 0.1 K was achieved at a pulse bias level of 4V and a pulse width of 55 μs for an F/1 optical system and an object around 300K.

Next referring to FIGS. 6 to 11 in addition to FIGS. 4 and 5, description will be made of a method of producing a thermal infrared detector according to the embodiment.

Figure 6:
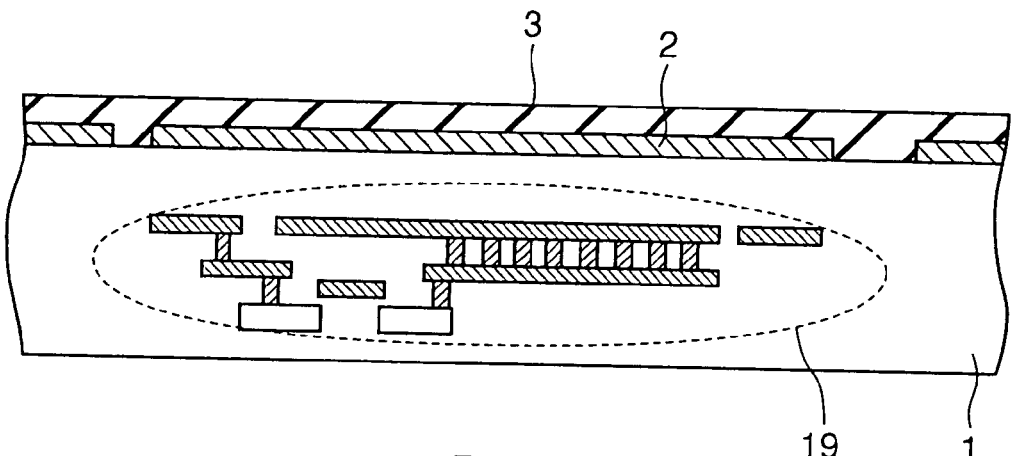
FIG. 6 is a sectional view for describing a first stage of production process of the thermal infrared detector illustrated in FIG. 4.

At first referring to FIG. 6, description will be made of a series of steps until the first dielectric protective film 3 is formed on the substrate 1.

In a first step, the substrate 1 with a readout circuit 19 is prepared. In a next step, the infrared reflecting film 2 made of titanium and having a thickness of about 200 nm is formed on the surface of the substrate at a portion corresponding to the diaphragm 5. Herein, the infrared reflecting film 2 is made of titanium. Instead of titanium, use may be made of any appropriate material which reflects substantially 100% of the infrared light in the wavelength band of 8–13 μm, for example, aluminum, tungsten, tungsten silicide, titanium nitride, or the like.

In a next step, the first dielectric protective film 3 comprising a silicon oxide film having a thickness of about 200 nm is formed throughout the surfaces of the substrate 1 and the infrared reflecting film 2. The first dielectric protective film 3 may be a silicon nitride film or a silicon oxynitride film instead of the silicon oxide film.

Figure 7:
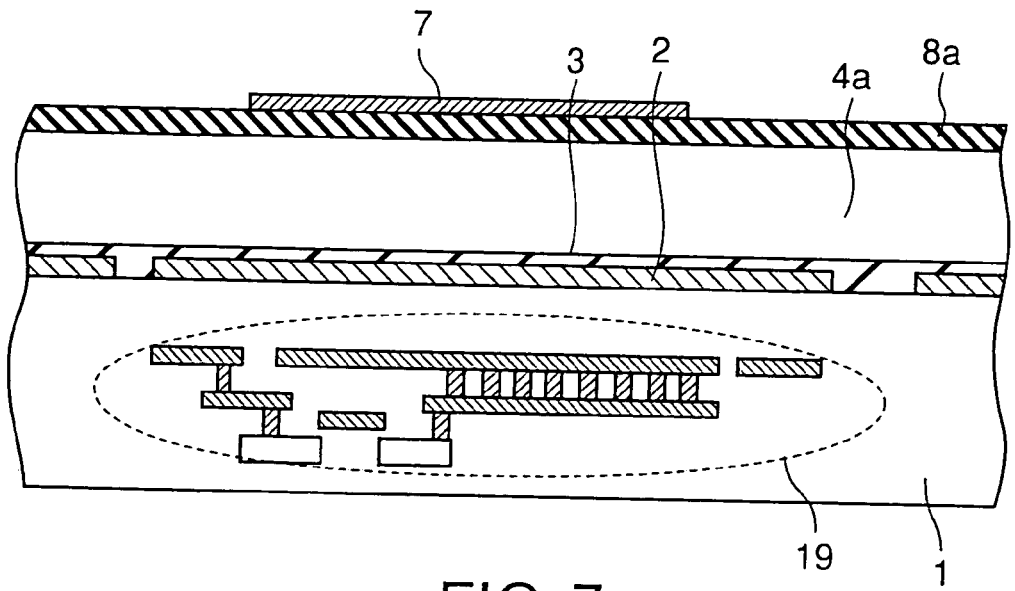
FIG. 7 is a sectional view for describing a next stage following the stage in FIG. 6.

Next referring to FIG. 7, description will be made of a series of steps until the bolometer thin film 7 is formed.

In a next step, a first sacrificial layer 4a is formed on the first dielectric protective film 3. The first sacrificial layer 4a is made of polyimide and is to be removed in a final stage of production process. In order to form the first sacrificial layer 4a, photosensitive polyimide is applied throughout an entire surface of the first dielectric protective film 3. Via a process of exposure, development, and heat treatment, the photosensitive polyimide on the first dielectric protective film 3 is patterned. By the patterning, a hole is formed at a position corresponding to the contact pad 16 in FIG. 4 to expose the first dielectric protective film 3. Thus, the first sacrificial layer 4a made of photosensitive polyimide is formed. The thickness of the first sacrificial layer 4a made of polyimide is equal to about 2.3 μm.

In a next step, the second dielectric protective film 8a comprising the silicon nitride film having a thickness of about 150 nm is formed by plasma CVD throughout an entire surface of the first sacrificial layer 4a and an exposed surface of the first dielectric protective film 3 so that the first sacrificial layer 4a is covered with the second dielectric protective film 8a. The second dielectric protective film 8a may comprise a silicon oxide film or a silicon oxynitride film Instead of the silicon nitride film.

In a next step, the bolometer thin film 7 as a heat detecting material film is formed on the surface of the second dielectric protective film 8a at a portion corresponding to the diaphragm 5. In order to form the bolometer thin film 7, a vanadium oxide film as a heat detecting material thin film made of a thermistor-bolometer material is formed throughout an entire surface of the second dielectric protective film 8a by reactive sputtering to the thickness of about 120 nm. Then, after an exposure and development step, the vanadium oxide film on the second dielectric protective film 8a is etched, for example, by plasma of a mixed gas of sulfur hexafluoride ($SF_6$) and carbon dioxide ($CO_2$) as described in Japanese Unexamined Patent Publication JP H11-330051 A. By the exposure and development step and the etching step mentioned above, the vanadium oxide film is patterned to form the bolometer thin film 7 in which vanadium oxide serves as a thermistor.

Next referring to FIG. 8, description will be made of a series of steps until the fourth dielectric protective film 8c is formed.

In a next step, the third dielectric protective film 8b comprising a silicon nitride film is formed by plasma CVD throughout a surface of the bolometer thin film 7 and an exposed surface of the second dielectric protective film 8a to the thickness of about 100 nm so as to cover the bolometer thin film 7. The third dielectric protective film 8b may be a silicon oxide film or a silicon oxynitride film Instead of the silicon nitride film.

In a next step, an opening for electrically connecting the contact pad 16 and the metal wiring 9 of the beam 6 is formed in each of the first dielectric protective film 3 and the second and the third dielectric protective films 8a and 8b at a portion corresponding to the contact pad 16. This step is carried out by the use of plasma of a mixed gas of carbon tetrafluoride ($CF_4$) and dioxygen ($O_2$) or a mixed gas of fluoroform ($CHF_3$) and dioxygen ($O_2$) in order to etch the dielectric protective film comprising the silicon nitride film, the silicon oxynitride film, or the silicon oxide film.

In a next step, in order to obtain electrical contact between the bolometer thin film 7 and the electrode portions 10, contact holes are formed in the third dielectric protective film 8b at the opposite end portions of the bolometer thin film 7 at positions corresponding to the electrode portions 10. Each of the contact hole has an elongated shape corresponding to that of the electrode portion 10 and extends along the edge of the bolometer thin film 7. Thus, a part of the surface of the bolometer thin film 7 is exposed at the bottom of the contact hole.

In the step of forming the contact hole on the electrode portion 10, the exposure and development step is followed by the step of etching the third dielectric protective film 8b at the opposite end portions of the bolometer thin film 7 at the positions corresponding to the contact holes by the use of plasma of a mixed gas of carbon tetrafluoride and dioxygen or a mixed gas of fluoroform and dioxygen.

In a next step, in order to electrically connect the readout circuit 19 in the substrate 1 and the bolometer thin film 7, metal films (9, 10), for example, made of titanium (Ti) or a nickel-chromium alloy (NiCr) are formed by sputtering throughout an entire surface of the third dielectric protective film 8b and throughout an inner wall of each contact hole including the exposed surface of the bolometer thin film 7. Next, after an exposure and development step, the metal films (9, 10) are etched and patterned, for example, by the use of plasma of a mixed gas of chlorine ($Cl_2$) and boron trichloride ($BCl_2$) in case where the metal films (9, 10) are made of titanium. By the patterning, the metal films (9, 10) are shaped into electric wirings electrically connecting the bolometer thin film 7 and the contact pad 16. Herein, titanium is used as the metal films (9, 10). Instead of titanium, a nickel-chromium alloy or a titanium alloy having a small thermal conductivity may be used.

In the metal films (9, 10), the electrode portions 10 are formed at the portions adjacent to the bolometer thin film 7 and the metal wirings 9 are formed at the portions corresponding to the beams 6. As illustrated in FIG. 4, the metal wiring 9 is electrically connected to the contact pad 16.

In a next step, the fourth dielectric protective film 8c comprising a silicon nitride film is formed by plasma CVD to the thickness of about 250 nm throughout entire surfaces of the metal films 9 and 10 and an exposed surface of the third dielectric protective film 8b. Herein, the silicon nitride film is used as the fourth dielectric protective film 8c. Instead of the silicon nitride film, a silicon oxide film or a silicon oxynitride film may be used.

Next referring to FIG. 9, description will be made of a series of steps until a second sacrificial layer 21 is formed.

Figure 8:
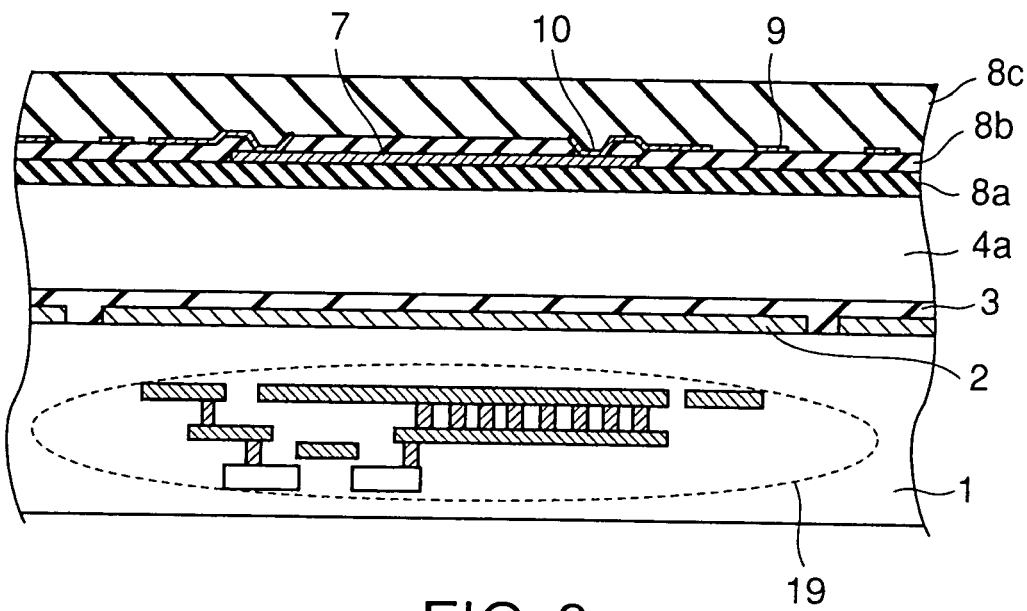
FIG. 8 is a sectional view for describing a next stage following the stage in FIG. 7.

In order to form the thermal isolation structure in which the diaphragm 5 is supported by the beams 6 to be afloat above from the silicon substrate 1, the second, the third, and the fourth dielectric protective films 8a, 8b, and 8c illustrated in FIG. 8 are collectively patterned to form a first slit 20a and a boundary slit 20b. The first slit 20a serves as a gap between the diaphragm 5 and the beam 6 in a single pixel while the boundary slit 20b serves as a gap between the beams 6 in adjacent pixels.

In order to form the first slit 20a and the boundary slit 20b, the exposure and development step is followed by the etching step in which each of the second, the third, and the fourth dielectric protective films 8a, 8b, and 8c is etched into a slit-like shape by plasma of a mixed gas of fluoroform and dioxygen. As a consequence, a polyimide surface of the first sacrificial layer 4a is exposed at the bottom of each of the first slit 20a and the boundary slit 20b.

In a next step, in order to decrease the thermal capacity of the diaphragm 5 and to reduce the thermal time constant, the fourth dielectric protective film 8c is partly etched and reduced in thickness only in an area above the diaphragm 5, as illustrated in the figure. Specifically, as illustrated in the figure, a resist is formed in an area except the diaphragm 5 by a typical process of application, exposure, and development. By the use of plasma of a mixed gas of carbon tetrafluoride and dioxygen or a mixed gas of fluoroform and dioxygen, the fourth dielectric protective film 8c is partly etched and removed by about 200 nm to form the fifth dielectric protective film 8d in the area of the diaphragm 5.

After the above-mentioned step, the total thickness of the second, the third, and the fifth dielectric protective films 8a, 8b, and 8d forming the diaphragm 5 is equal to 300 nm. An upper part and a lower part above and below the bolometer thin film 7 have an equal thickness of 150 nm. Likewise, the beam 6 comprising the second, the third, and the fourth dielectric protective films 8a, 8b, and 8c has a total thickness of 500 nm in which an upper part and a lower part above and below the metal wiring 9 has an equal thickness of 250 nm. Thus, the second, the third, and the fifth dielectric protective films 8a, 8b, and 8d of the diaphragm 5 and the second, the third, and the fourth dielectric protective films 8a, 8b, and 8c of the beam 6 are arranged symmetrical in the vertical direction. With this arrangement, stresses of the protective films act symmetrically. Therefore, it is possible to support the thermal isolation structure comprising the diaphragm 5 and the beams 6 to be afloat in parallel to the substrate 1.

On the fifth dielectric protective film 8d reduced in thickness in the area of the diaphragm 5, an etch stopper metal thin film 11a made of titanium nitride and having a thickness of 15 nm is formed. As a gas for etching titanium nitride, a mixed gas of chlorine and boron trichloride is used. The etch stopper metal thin film 11a may be made of titanium alloy, nickel-chromium alloy, aluminum, titanium, tungsten, or the like instead of titanium nitride.

Next, as illustrated in the figure, a second sacrificial layer 21 is formed on the first slit 20a and the boundary slit 20b in each of which polyimide of the first sacrificial layer 4a is exposed at the bottom and on the beam 6. The second sacrificial layer 21 is formed by photosensitive polyimide via a process of application, exposure, development, and heat treatment. The second sacrificial layer 21 may be made of a resist Instead of polyimide.

Next referring to FIGS. 10 and 11 in combination, description will be made of remaining steps.

Figure 10:
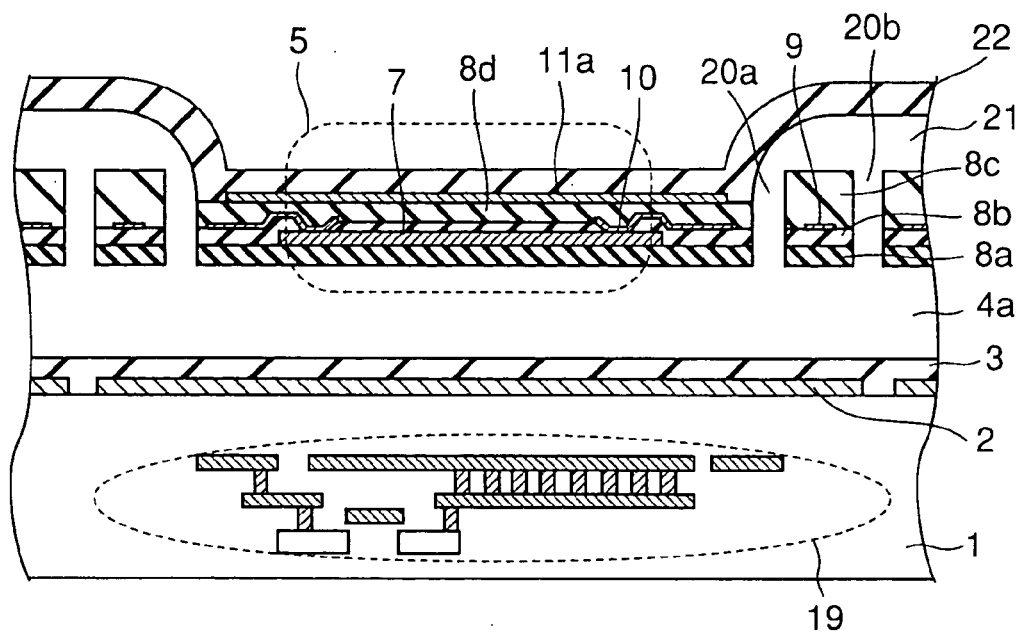
FIG. 10 is a sectional view for describing a next stage following the stage in FIG. 9.

In a next step, a shield-forming dielectric protective film 22 comprising a silicon nitride film is formed throughout the surfaces of the etch stopper metal thin film 11a formed in the area of the diaphragm 5 and the second sacrificial layer 21 to the thickness of about 500 nm, as illustrated in FIG. 10. The shield-forming dielectric protective film 22 may be a silicon oxide film or a silicon oxynitride film instead of the silicon nitride film.

Figure 9:
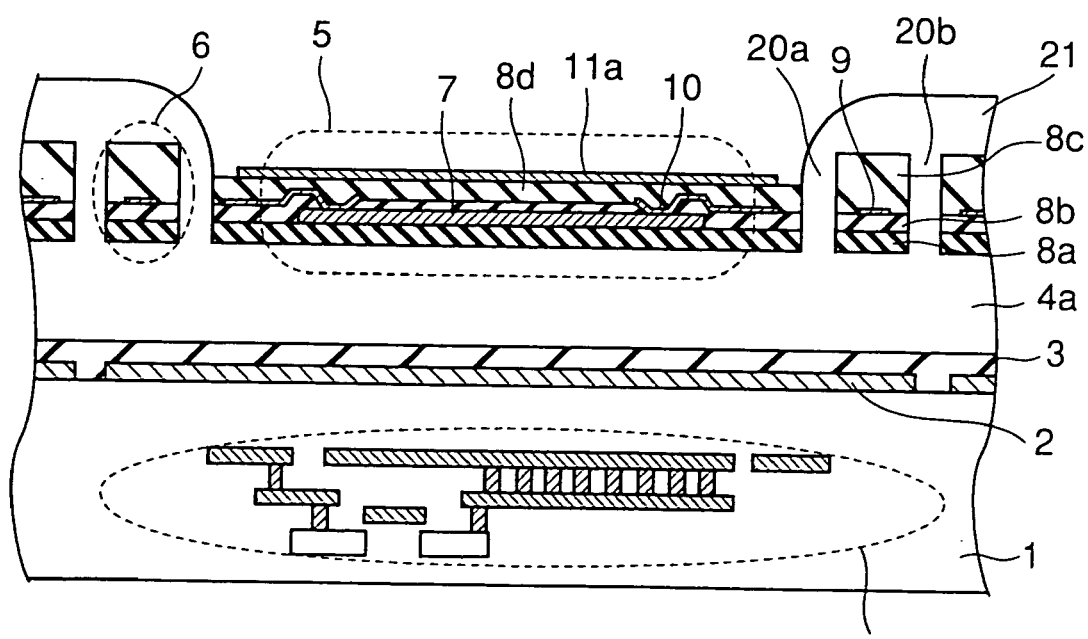
FIG. 9 is a sectional view for describing a next stage following the stage in FIG. 8.

In a subsequent step, a resist is formed on the shield-forming dielectric protective film 22 by a process of application, exposure, and development except in an area above the etch stopper metal thin film 11a which is formed in the area of the diaphragm 5 in the step of FIG. 9. By the use of plasma of a mixed gas of carbon tetrafluoride and dioxygen or a mixed gas of fluoroform and dioxygen, the shield-forming dielectric protective film 22 is partly etched and removed. At this time, etching is partly inhibited by the etch stopper metal thin film 11a of titanium nitride. Subsequently, by the use of a plasma etcher, the etch stopper metal thin film 11a of titanium nitride is etched and removed with a mixed gas of chlorine and boron trichloride.

In the above-mentioned state, the fifth dielectric protective film 8d is exposed in the area of the diaphragm 5 in FIG. 10 and the shield-forming dielectric protective film 22 is left in a remaining area except the area of the diaphragm 5.

Figure 11:
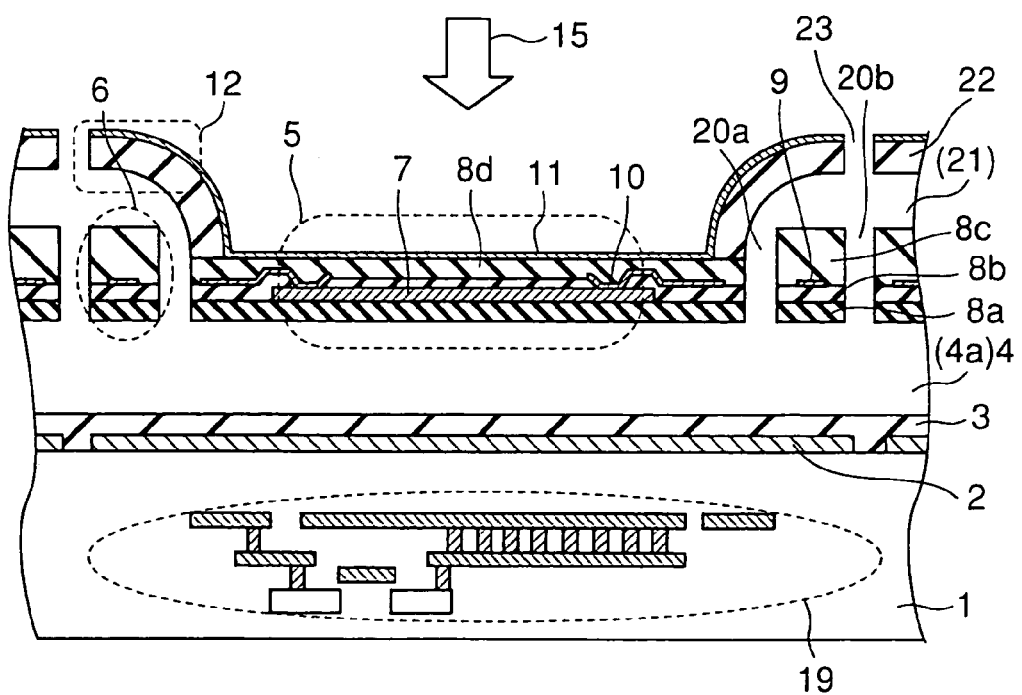
FIG. 11 is a sectional view for describing a final stage following the stage in FIG. 10.

In a next step, the infrared absorbing film 11 made of titanium nitride and having a thickness of 15 nm is deposited on the shield-forming dielectric protective film 22 and the fifth dielectric protective film 8d, as will be understood from FIG. 11. Herein, it is important that the infrared absorbing film 11 has a sheet resistance within a range of 200–560 Ω. Instead of titanium nitride, titanium alloy or nickel-chromium alloy may be used as the infrared absorbing film 11.

In a next step, a resist is formed on the infrared absorbing film 11 by a process of application, exposure, and development and is removed by patterning in a portion corresponding to a second slit 23. By the use of a mixed gas of chlorine and boron trichloride, the infrared absorbing film 11 of titanium nitride is partly etched and removed. Subsequently, the shield-forming dielectric protective film 22 is removed by a plasma gas of fluoroform and dioxygen to form the second slit 23 and to expose polyimide of the second sacrificial layer 21.

In a final step, polyimide of each of the second sacrificial layer 21 and the first sacrificial layer 4a is removed by ashing using plasma of dioxygen to form the cavity 4 illustrated in FIG. 5 in an area corresponding to the first sacrificial layer 4a. As a result, manufacture of the thermal infrared detector having a thermal isolation structure with a shield and having a short thermal time constant is completed.

As described above, the infrared absorbing film 11 comprising the metal thin film is formed on the surfaces of the shield 12 and the diaphragm 5. Thus, the thermal infrared detector is formed so that the infrared absorbing film 11 of the metal thin film causes interference of the infrared light to thereby heat the metal thin film.

Next referring to FIGS. 4 and 11 in combination, description will be made of operation of the thermal infrared detector described above.

At first, the infrared light 15 is incident to the infrared absorbing film 11 comprising the metal thin film and covering the surfaces of the shield 12 and the diaphragm 5. In this event, a part of the infrared light 15 is going to be reflected by the infrared absorbing film 11 comprising the metal thin film. On the other hand, the rest of the infrared ray 15 incident to the infrared absorbing film 11 passes through the infrared absorbing film 11 and advances towards the substrate 1. The infrared light which has passed through the infrared absorbing film 11 is reflected by the infrared reflecting film 2 on the substrate 1, the metal wiring 9 of the beam 6, and the contact pad 16 and directed towards the infrared absorbing film 11 to be incident to the infrared absorbing film 11 again.

Herein, the infrared light again incident to the infrared absorbing film 11 causes destructive interference with the original infrared light, which is going to be reflected by the infrared absorbing film 11, to cancel each other. The infrared light causing the interference is absorbed by free electrons in the infrared absorbing film 11 to generate heat. As a result, the infrared absorbing film 11 is heated and elevated in temperature. The heat of the infrared absorbing film 11 is transmitted through the shield 12 and the fifth dielectric protective film 8*d* in the diaphragm 5 to the bolometer thin film 7 so that the resistance value of the bolometer thin film 7 is changed. Thus, by presence of the infrared absorbing film 11 comprising the metal thin film formed on the surfaces of the shield 12 and the diaphragm 5, the heat of the shield 12 and the diaphragm 5 is quickly transmitted to the bolometer thin film 7.

The above-mentioned change in resistance value is transmitted as a signal through the electrode portions 10 electrically connected to the bolometer thin film 7 as the heat detecting material thin film, the metal wirings 9 of the beams 6, and the contact pad 16 of the substrate 1, for example, to the readout circuit 19 or an off-chip external circuit. The signal is converted by the readout circuit 19 or the off-chip external circuit into voltage change to be outputted as an electric signal. On the basis of the electric signal, the change in physical value of the heat detecting material thin film 7 resulting from the temperature change is represented as an infrared image.

Next referring to FIG. 11, description will be made of another embodiment different from the foregoing embodiment.

This embodiment is different from the foregoing embodiment in that the infrared absorbing film 11 in FIG. 11 is not formed and that the incident infrared light 15 is absorbed by the dielectric protective film 22 forming the shield 12 and the second, the third, and the fifth dielectric protective films 8*a*, 8*b*, and 8*d* of the diaphragm 5. Each of the second, the third, and the fifth dielectric protective films 8*a*, 8*b*, and 8*d* comprises a silicon nitride film or a silicon oxynitride film having an absorption band in the wavelength band of 10 μm.

The infrared light 15 incident to the diaphragm 5 is partly absorbed by the second, the third, and the fifth dielectric protective films 8*a*, 8*b*, and 8*d* forming the diaphragm 5 and partly passes through the diaphragm 5. The infrared light which has passed through the diaphragm 5 is reflected by the infrared reflective film 2 and absorbed again by the dielectric protective films 8*a*, 8*b*, and 8*d* of the diaphragm 5. The infrared light 15 incident to the shield 12 is partly absorbed by the shield-forming dielectric protective film 22 forming the shield 12 and partly passes through the shield 12. The infrared light which has passed through the shield 12 is reflected by the infrared reflective film 2, the metal wiring 9 of the beam 6, and a metal of the contact pad 16 to be absorbed again by the shield-forming dielectric protective film 22 of the shield 12. In the above-mentioned manner, the infrared light is absorbed to generate heat which is transmitted to the bolometer thin film 7 to change electric resistance of the bolometer thin film 7. The change in electric resistance is converted by the readout circuit 19 in the substrate 1 into voltage change which is represented to be converted into the infrared image.

As described above, in case where the materials of the shield and the diaphragm are transparent to the infrared light, the infrared absorbing film is essential in order to absorb the infrared light by the interference effect and are formed on the infrared incident surfaces of the shield and the diaphragm. On the other hand, in case where each of the shield and the diaphragm is made of a material absorbing the infrared light, the infrared absorbing film need not necessarily be formed. Generally, however, the materials of the shield and the diaphragms do not absorb all of the infrared light. Therefore, it may be advisable to form the infrared absorbing film.

In the foregoing description, the infrared absorbing film is formed on the infrared incident surfaces of the shield and the diaphragm. As regards the shield, the infrared absorbing film may be formed on the other surface opposite to the infrared incident surface. With this structure, the above-mentioned step of forming and removing the etch stopper metal thin film is unnecessary.

Figure 12:
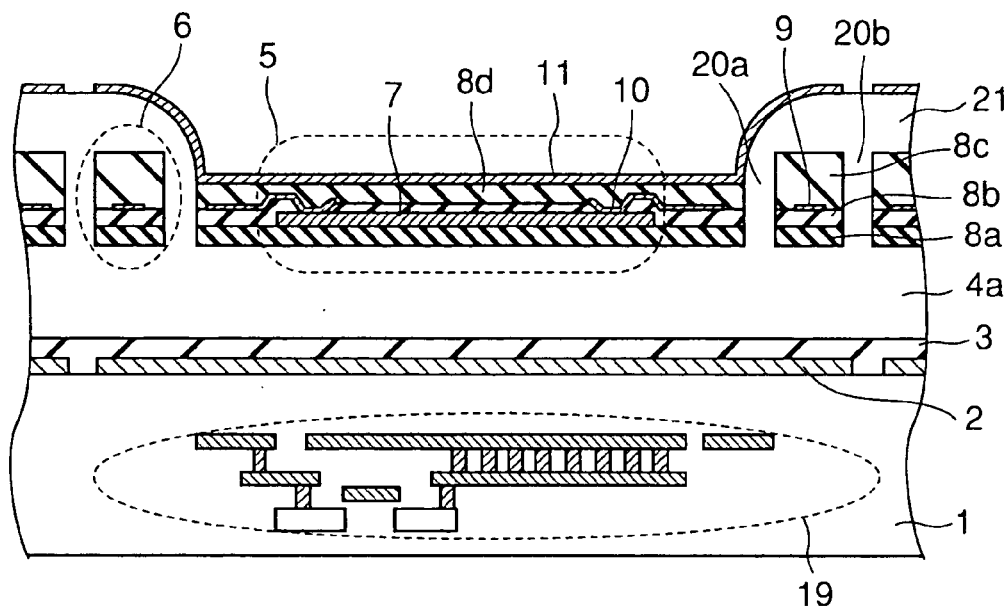
FIG. 12 is a sectional view for describing a next stage following the stage in FIG. 8 as a production process different from that in FIG. 9.

Next referring to FIGS. 12 through 14, description will be made of a series of steps in this embodiment following the step in FIG. 8.

In a first step following the step in FIG. 8, in order to form the thermal isolation structure in which the diaphragm 5 is supported by the beams 6 to be afloat from the silicon substrate 1, the second, the third, and the fourth dielectric protective films 8*a*, 8*b*, and 8*c* illustrated in FIG. 8 are collectively patterned to form the first slit 20*a* and the boundary slit 20*b*. The first slit 20*a* serves as a gap between the diaphragm 5 and each of the beams 6 in a single pixel and the boundary slit 20*b* serves as a gap between the beams 6 in adjacent pixels.

In order to form each of the first slit 20*a* and the boundary slit 20*b*, the exposure and development process is followed by the step of etching each of the second, the third, and the fourth dielectric protective films 8*a*, 8*b*, and 8*c* in a slit-like shape by the use of plasma of a mixed gas of fluoroform and dioxygen. As a consequence, a polyimide surface of the first sacrificial layer 4*a* is exposed at the bottom of each of the first slit 20*a* and the boundary slit 20*b*.

In a next step, in order to reduce the thermal capacity of the diaphragm 5 and to thereby reduce the thermal time constant, the fourth dielectric protective film 8*c* is etched and reduced in thickness only in an area above the diaphragm 5, as illustrated in the figure. Specifically, a resist is formed in an area except the diaphragm 5 by a typical process of application, exposure, and development. By the use of plasma of a mixed gas of carbon tetrafluoride and dioxygen or a mixed gas of fluoroform and dioxygen, the fourth dielectric protective film 8*c* is etched and removed by about 200 nm to form the fifth dielectric protective film 8*d* in the area of the diaphragm 5, as illustrated in the figure.

After the above-mentioned step, the total thickness of the second, the third, and the fifth dielectric protective films 8*a*, 8b, and 8d forming the diaphragm 5 is equal to 300 nm. An upper part and a lower part above and below the bolometer thin film 7 have an equal thickness of 150 nm. Likewise, the beam 6 comprising the second, the third, and the fourth dielectric protective films 8a, 8b, and 8c has a total thickness of 500 nm in which an upper part and a lower part above and below the metal wiring 9 has an equal thickness of 250 nm. Thus, the second, the third, and the fifth dielectric protective films 8a, 8b, and 8d of the diaphragm 5 and the second, the third, and the fourth dielectric protective films 8a, 8b, and 8c of the beam 6 are arranged symmetrical in the vertical direction. With this arrangement, stresses of the protective films act symmetrically. Therefore, it is possible to support the thermal isolation structure comprising the diaphragm 5 and the beams 6 to be afloat in parallel to the substrate 1.

The above-mentioned steps are similar to those described in conjunction with FIG. 9 but subsequent steps are different.

In a next step, the second sacrificial layer 21 is formed in an area except the diaphragm 5 by the use of photosensitive polyimide via a process of application, exposure, development, and heat treatment. The second sacrificial layer 21 may be made of a resist Instead of polyimide.

In a next step, the infrared absorbing film 11 made of titanium nitride and having a thickness of 15 nm is formed on the fifth dielectric protective film 8d of the diaphragm 5 and on the second sacrificial layer 21. Then, the infrared absorbing film 11 of titanium nitride is etched at a position where the second slit 23 is to be formed in correspondence to the boundary slit 20b as will later be described. The etching is carried out by the use of a mixed gas of chlorine and boron trichloride. By this step, the state illustrated in FIG. 12 is obtained.

Figure 13:
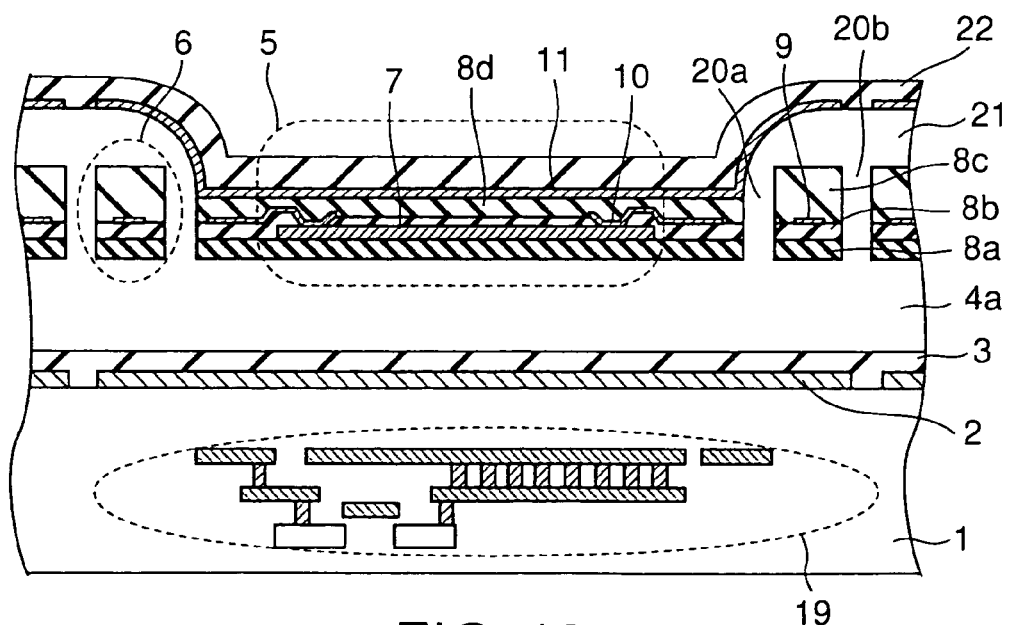
FIG. 13 is a sectional view for describing a next stage following the stage in FIG. 12.
Figure 14:
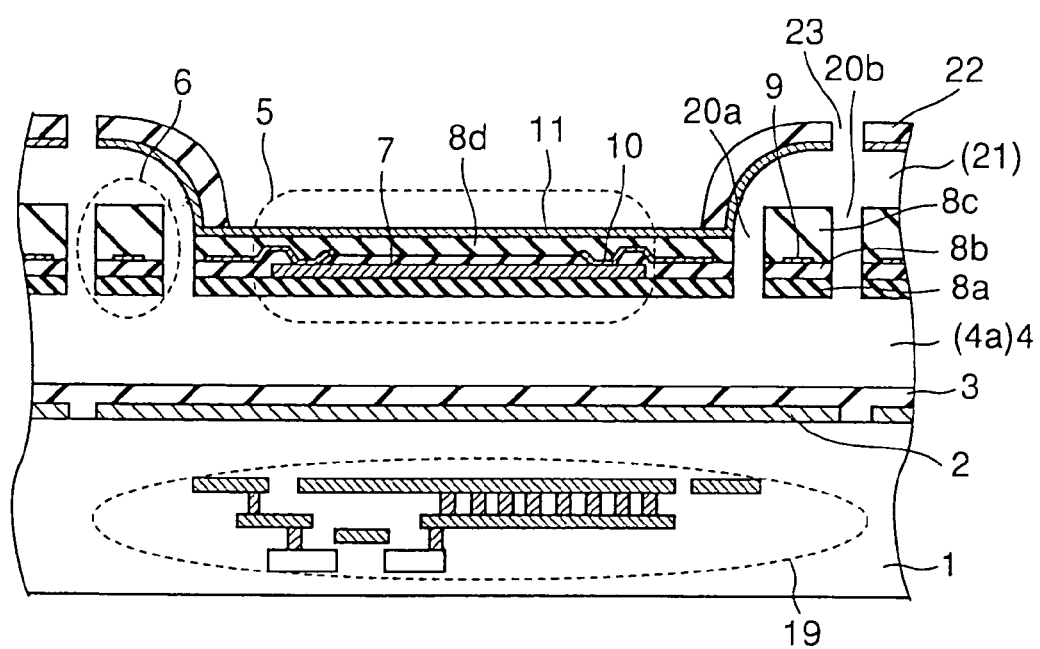
FIG. 14 is a sectional view for describing a final stage following the stage in FIG. 13.

Next referring to FIG. 13, in a next step, the shield-forming dielectric protective film 22 comprising the silicon nitride film is formed throughout an entire surface of the infrared absorbing film 11 and on an exposed surface of the second sacrificial layer 21 to the thickness of about 500 nm. The shield-forming dielectric protective film 22 may be a silicon oxide film or a silicon oxynitride film instead of the silicon nitride film.

Next referring to FIG. 14 in addition, description will be made of remaining steps.

In a step following the above-mentioned step, a resist is formed on the shield-forming dielectric protective film 22 by a process of application, exposure, and development except in the area above the diaphragm 5 and the area corresponding to the boundary slit 20b. By plasma of a mixed gas of fluoroform and dioxygen, the shield-forming dielectric protective film 22 is etched and removed in the area above the diaphragm 5. Simultaneously, in the area corresponding to the boundary slit 20b, the shield-forming dielectric protective film 22 is etched and removed so as to form the second slit 23 in which polyimide of the second sacrificial layer 21 is exposed at the bottom. While the shield-forming dielectric protective film 22 on the diaphragm 5 is etched, the infrared absorbing film 11 of titanium nitride serves as an etch stopper.

As a final step, polyimide of the second sacrificial layer 21 and polyimide of the first sacrificial layer 4a are removed by ashing using plasma of dioxygen to form the cavity 4. Thus, the thermal infrared detector with a shield having a thermal isolation structure and a short thermal time constant is produced.

In the foregoing description, the heat detecting material thin film is a thermistor-bolometer thin film and the change in temperature due to heat transmitted from the diaphragm is detected as change in electric resistance. However, this invention is not restricted to the foregoing embodiment. The heat detecting material thin film may be made of any other appropriate material and the change in temperature of the heat detecting material thin film may be detected by any other appropriate physical value. For example, the heat detecting material thin film may comprise a ferroelectric thin film such as lead titanate and the change in temperature may be detected as the amount of electric charges produced in the ferroelectric thin film.

By adopting the above-mentioned structure, it is possible to achieve a sensor high in fill factor, higher in sensitivity, and high in frame rate. The thermal infrared detector described above is desirably mounted in a vacuum package in order to further improve the sensitivity.

As described above, according to this invention, by etching the protective film of the diaphragm to reduce the thickness of the diaphragm as a whole, it is possible to decrease the thermal capacity of the diaphragm and to reduce the thermal time constant so that operation at a high frame rate can be carried out. As a consequence, it is possible to prevent occurrence of the image blur.

In addition, since the bolometer thin film is formed throughout an entire surface of the diaphragm, the 1/f noise is prevented from being increased.

Therefore, it is possible to provide a thermal infrared detector which is capable of preventing occurrence of image blur even if operation is carried out at a high frame rate, which is capable of preventing increase in 1/f noise, and which is large in fill factor, high in sensitivity, and small in thermal time constant.

As a consequence, an uncooled infrared sensor can be mounted to a high frame rate apparatus, such as a missile seeker, to which a cooled infrared sensor has been mounted so far. By the use of the uncooled sensor, a cooler is unnecessary and quick operation is enabled.

What is claimed is:

1. A thermal infrared detector having a thermal isolation structure and comprising a substrate having an infrared reflecting film formed on a surface thereof, a thin-film infrared detecting portion which is separated by a cavity from the surface of the substrate and which absorbs an infrared ray incident thereto and generates heat to thereby detect incidence of the infrared ray as temperature change, a beam separated by a gap from the infrared detecting portion and supporting the infrared detecting portion separated by the cavity from the substrate, and an electrode portion and a metal wiring each of which is made of a conductive material and which establish electrical connection between predetermined portions, the thermal infrared detector further comprising:

a shield which extends from an outer perimeter of the infrared detecting portion separated by a gap from the beam so as to cover the beam on an infrared incident side with a space interposed between the beam and the shield and which has an infrared absorbing function together with the infrared detecting portion;

the beam being greater in thickness than the entire infrared detecting portion in a direction perpendicular to a surface of the infrared detecting portion.

2. A thermal infrared detector according to claim 1, wherein:

the infrared detecting portion has an infrared absorbing film formed on an infrared incident surface thereof;

the shield having an infrared absorbing film formed on at least one of an infrared incident surface and an opposite surface thereof.

3. A thermal infrared detector according to claim 1, wherein:
each of the infrared detecting portion and the shield is covered with a dielectric protective film made of an infrared absorbing material.

4. A thermal infrared detector having a thermal isolation structure, the thermal infrared detector comprising, in each pixel area:
a substrate having a contact pad;
an infrared detecting portion which comprises a heat detecting material thin film, an electrode portion electrically connected to the heat detecting material thin film, a dielectric protective film surrounding the electrode portion and the heat detecting material thin film, and an infrared absorbing film and which is separated by a space from a surface of the substrate and arranged above the surface of the substrate;
a beam which supports the infrared detecting portion above the substrate so that the infrared detecting portion is afloat above and separated from the surface of the substrate and which has a wiring made of a conductive material and electrically connecting the electrode portion of the infrared detecting portion to the contact pad of the substrate, the conductive material being surrounded by a dielectric protective film greater in thickness than the dielectric protective film of the infrared detecting portion in a direction perpendicular to the surface of the substrate; and
a shield extending outward from an outer perimeter of the infrared detecting portion so as to cover top surfaces of the beam and the contact pad which are opposite to substrate-facing surfaces with an interposed space from the top surfaces of the beam and the contact pad, the shield having an infrared absorbing film formed on at least one of an infrared incident surface and an opposite surface thereof,
wherein the beam is greater in thickness than the entire infrared detecting portion in a direction perpendicular to the a surface of the infrared detecting portion.

5. A thermal infrared detector having a thermal isolation structure, the thermal infrared detector comprising:
a substrate having a contact pad;
an infrared detecting portion which comprises a heat detecting material thin film, an electrode portion electrically connected to the heat detecting material thin film, a dielectric protective film made of an infrared absorbing material and surrounding the electrode portion and the heat detecting material thin film and which is separated by a space from one surface of the substrate and arranged above the one surface;
a beam which supports the infrared detecting portion above the substrate so that the infrared detecting portion is afloat above and separated from a surface of the substrate and which has a wiring made of a conductive material and electrically connecting the electrode portion of the infrared detecting portion to the contact pad of the substrate, the conductive material being surrounded by a dielectric protective film greater in thickness than the dielectric protective film of the infrared detecting portion in a direction perpendicular to the surface of the substrate; and
a shield made of an infrared absorbing material and extending outward from an outer perimeter of the infrared detecting portion so as to cover top surfaces of the beam and the contact pad which are opposite to substrate-facing surfaces with an interposed space from the top surfaces of the beam and the contact pad, the shield having an infrared absorbing film formed on at least one of an infrared incident surface and an opposite surface thereof,
wherein the beam is greater in thickness than the entire infrared detecting portion in a direction perpendicular to the a surface of the infrared detecting portion.

6. A method of producing a thermal infrared detector having a thermal isolation structure and comprising a substrate having an infrared reflecting film formed on a surface thereof in each pixel area, a thin-film infrared detecting portion which is separated by a cavity from the surface of the substrate, which is provided for each pixel, and which absorbs an infrared ray incident thereto and generates heat to thereby detect incidence of the infrared ray as temperature change, and a beam separated by a gap from the infrared detecting portion and supporting the infrared detecting portion separated by the cavity from the substrate, and an electrode portion and a metal wiring each of which is made of a conductive material and which establish electrical connection between predetermined portions, the method comprising the steps of:
preparing the substrate having a contact pad;
forming, on a surface of the substrate on which the contact pad is present, the infrared reflecting film at a portion corresponding to the infrared detecting portion;
forming a first dielectric protective film throughout an entire surface of the substrate, including a surface of the infrared reflecting film;
forming, on the surface of the substrate on which the contact pad is present, a first sacrificial layer for forming the cavity;
forming a second dielectric protective film on a surface of the first sacrificial layer;
forming a heat detecting material thin film on a surface of the second dielectric protective film at a portion corresponding to the infrared detecting portion;
forming a third dielectric protective film throughout an entire surface of an exposed part of the second dielectric protective film except a part of the heat detecting material thin film;
forming openings in each of the first, the second, and the third dielectric protective film at a portion corresponding to the contact pad and in the heat detecting material thin film at a portion corresponding to the electrode;
forming a metal film throughout an entire surface of the third dielectric protective film and an entire inner wall of each of the openings;
patterning the metal film so that the third dielectric protective film is exposed to form the electrode of the infrared detecting portion and the metal wiring of the beam;
forming a fourth dielectric protective film on a surface of each of the metal wiring and the third dielectric protective film;
patterning the second, the third, and the fourth dielectric protective films so that the first sacrificial layer is exposed, to thereby form a first slit as a gap between the infrared detecting portion and the beam and a boundary slit as a boundary between adjacent pixels;
etching the fourth dielectric protective film on the infrared detecting portion so that the thickness of the fourth dielectric protective film is reduced, to thereby form a fifth dielectric protective film;
forming an etch stopper metal thin film on the fifth dielectric protective film of the infrared detecting portion except an area to become an end portion of a shield which extends from an outer perimeter of the infrared detecting portion separated by a gap from the beam so as to cover the beam on an infrared incident side with a space interposed between the beam and the shield forming, on the surface of the fourth dielectric protective film, a second sacrificial layer for forming the first slit and the boundary slit each having an exposed surface of the first sacrificial layer at the bottom, a space between the beam and the shield, and a space between the contact pad of the substrate and the shield;

forming a shield-forming dielectric protective film for forming the shield, on the second sacrificial layer, an exposed surface of the fifth dielectric protective film, and an exposed surface of the etch stopper metal thin film;

etching the shield-forming dielectric protective film in an area above the infrared detecting portion except a base of the shield to expose the etch stopper metal thin film;

etching and removing the etch stopper metal thin film to expose the fifth dielectric protective film;

patterning the shield-forming dielectric protective film so as to expose a part of the second sacrificial layer is exposed, thereby forming a second slit; and removing the second and the first sacrificial layers through the second slit, the first slit, and the boundary slit.

7. A method according to claim 6, wherein the step of etching and removing the etch stopper metal thin film to expose the fifth dielectric protective film is followed by a step of forming an infrared absorbing film comprising a metal thin film on surfaces of the shield-forming dielectric protective film and the fifth dielectric protective film, the infrared absorbing film being patterned in addition to the shield-forming dielectric protective film in the subsequent step of patterning the shield-forming dielectric protective film so that a part of the second sacrificial layer is exposed, to thereby form the second slit.

8. A method according to claim 6, wherein each of the shield-forming dielectric protective film and the second, the third, and the fifth dielectric protective films is made of an infrared absorbing material.

9. A method of producing a thermal infrared detector having a thermal isolation structure and comprising a substrate having an infrared reflecting film formed on a surface thereof in each pixel area, a thin-film infrared detecting portion which is separated by a cavity from the surface of the substrate, which is provided for each pixel, and which absorbs an infrared ray incident thereto and generates heat to thereby detect incidence of the infrared ray as temperature change, and a beam separated by a gap from the infrared detecting portion and supporting the infrared detecting portion separated by the cavity from the substrate, and an electrode portion and a metal wiring each of which is made of a conductive material and which establish electrical connection between predetermined portions, the method comprising the steps of:

preparing the substrate having a contact pad;

forming, on a surface of the substrate on which the contact pad is present, the infrared reflecting film at a portion corresponding to the infrared detecting portion;

forming a first dielectric protective film throughout an entire surface of the substrate, including a surface of the infrared reflecting film;

forming, on the surface of the substrate on which the contact pad is present, a first sacrificial layer for forming the cavity;

forming a second dielectric protective film on a surface of the first sacrificial layer;

forming a heat detecting material thin film on a surface of the second dielectric protective film at a portion corresponding to the infrared detecting portion;

forming a third dielectric protective film throughout an entire surface of an exposed part of the second dielectric protective film except a part of the heat detecting material thin film;

forming openings in each of the first, the second, and the third dielectric protective film at a portion corresponding to the contact pad and in the heat detecting material thin film at a portion corresponding to the electrode;

forming a metal film throughout an entire surface of the third dielectric protective film and an entire inner wall of each of the openings;

patterning the metal film so that the third dielectric protective film is exposed to form the electrode of the infrared detecting portion and the metal wiring of the beam;

forming a fourth dielectric protective film on a surface of each of the metal wiring and the third dielectric protective film;

patterning the second, the third, and the fourth dielectric protective films so that the first sacrificial layer is exposed, to thereby form a first slit as a gap between the infrared detecting portion and the beam and a boundary slit as a boundary between adjacent pixels;

etching the fourth dielectric protective film on the infrared detecting portion so that the thickness of the fourth dielectric protective film is reduced, to thereby form a fifth dielectric protective film;

forming, on the surface of the fourth dielectric protective film, a second sacrificial layer for forming the first slit and the boundary slit each having an exposed surface of the first sacrificial layer at the bottom, a space between the beam and the shield covering the beam on an infrared incident side, and a space between the contact pad of the substrate and the shield;

forming an infrared absorbing film on a surface of the fifth dielectric protective film and on a surface of the second sacrificial layer;

forming, throughout an entire surface of the infrared absorbing film and on an exposed surface of the second sacrificial layer at a portion corresponding to the boundary slit, a shield-forming dielectric protective film for forming the shield;

patterning the shield-forming dielectric protective film so as to expose a part of the second sacrificial layer which corresponds to the boundary slit, thereby forming a second slit; and removing the second and the first sacrificial layers through the second slit, the first slit, and the boundary slit.

* * * * *